(12) United States Patent
Kobayashi et al.

(10) Patent No.: US 10,474,085 B2
(45) Date of Patent: Nov. 12, 2019

(54) IMAGE FORMATION APPARATUS, CONTROL METHOD, AND CONTROL PROGRAM FOR CALCULATING A SPEED OF CONVEYANCE

(71) Applicant: Konica Minolta, Inc., Chiyoda-ku, Tokyo (JP)

(72) Inventors: Yuji Kobayashi, Toyohashi (JP); Takaki Kato, Toyokawa (JP); Masayuki Fukunaga, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/369,031

(22) Filed: Dec. 5, 2016

(65) Prior Publication Data

US 2017/0168444 A1 Jun. 15, 2017

(30) Foreign Application Priority Data

Dec. 15, 2015 (JP) ................. 2015-244284

(51) Int. Cl.
*G03G 15/00* (2006.01)
*G03G 15/20* (2006.01)
*G01P 3/36* (2006.01)

(52) U.S. Cl.
CPC ........... *G03G 15/6529* (2013.01); *G01P 3/36* (2013.01); *G03G 15/2028* (2013.01); *G03G 2215/00556* (2013.01); *G03G 2215/00645* (2013.01)

(58) Field of Classification Search
CPC .......... G03G 15/6529; G03G 15/2028; G03G 2215/00556; G03G 2215/00645; G01P 3/36
See application file for complete search history.

(56) References Cited

U.S. PATENT DOCUMENTS

2010/0225931 A1* 9/2010 Jokinen ................ G01B 11/024
356/625
2010/0310284 A1* 12/2010 Funato ..................... G01P 3/68
399/302

(Continued)

FOREIGN PATENT DOCUMENTS

CN 101923299 A 12/2010
JP H07-294537 A 11/1995

(Continued)

OTHER PUBLICATIONS

Extended European Search Report dated May 9, 2017, issued by the European Patent Office in corresponding European Application No. 16202913.6. (8 pages).

(Continued)

*Primary Examiner* — Victor Verbitsky
(74) *Attorney, Agent, or Firm* — Buchanan Ingersoll & Rooney PC

(57) ABSTRACT

An image formation apparatus includes a conveyor configured to convey a moving element on which an image is formed, a generator configured to generate a first image and a second image by shooting the conveyed moving element at different timing, a detector configured to sense a first distance between the generator and the moving element at the time of shooting of the first image and sense a second distance between the generator and the moving element at the time of shooting of the second image, and a hardware processor configured to calculate a speed of conveyance of the moving element based on the first image, the second image, the first distance, and the second distance, and output the speed of conveyance.

18 Claims, 14 Drawing Sheets

(56) References Cited

U.S. PATENT DOCUMENTS

2012/0269531 A1 10/2012 Suzuki et al.
2014/0044460 A1 2/2014 Kudo et al.

FOREIGN PATENT DOCUMENTS

| JP | 2006-220845 A | 8/2006 |
| JP | 2009-251237 A | 10/2009 |
| JP | 2010055064 A | 3/2010 |

OTHER PUBLICATIONS

Office Action (Notice of Grounds of Rejection) dated Jan. 30, 2018, by the Japanese Patent Office in corresponding Japanese Patent Application No. 2015-244284 and English translation of the Office Action. (9 pages).

Communication pursuant to Article 94(3) EPC dated Apr. 20, 2018, by the European Patent Office in corresponding European Patent Application No. 16 202 913.6. (7 pages).

Office Action dated Jul. 3, 2018, by the Japanese Patent Office in corresponding Japanese Patent Application No. 2015-244284 and an English translation of the Office Action. (9 pages).

Office Action dated Jul. 30, 2018, by the State Intellectual Property Office of People's Republic of China in corresponding Chinese Patent Application No. 201611151994.2 and an English translation of the Office Action. (17 pages).

Office Action (Communication pursuant to Article 94(3) EPC) dated Nov. 5, 2018, by the European Patent Office in corresponding European Patent Application No. 16202913.6. (5 pages).

Summons to attend oral proceedings pursuant to Rule 115(1) EPC dated May 15, 2019, by the European Patent Office in corresponding European Patent Application No. 16202913.6. (8 pages).

* cited by examiner (FIRST IMAGE)
AMOUNT OF DEVIATION IN SHOOTING
DISTANCE 0mm⇒MAGNIFICATION OF
SHOOTING 1.0

(SECOND IMAGE)
AMOUNT OF DEVIATION IN SHOOTING
DISTANCE −0.5mm⇒MAGNIFICATION OF
SHOOTING 0.9

DIRECTION OF CONVEYANCE ←

12 # IMAGE FORMATION APPARATUS, CONTROL METHOD, AND CONTROL PROGRAM FOR CALCULATING A SPEED OF CONVEYANCE

The entire disclosure of Japanese Patent Application. No. 2015-244284 filed on Dec. 15, 2015 including description, claims, drawings, and abstract is incorporated herein by reference in the entirety.

BACKGROUND OF THE INVENTION

Field of the Invention

The present disclosure relates to control of an image formation apparatus and particularly to control of an image formation apparatus of an electrophotography type.

Description of the Related Art

An image formation apparatus of an electrophotography type has widely been used. The image formation, apparatus of the electrophotography type performs, as print processing, evenly charging a photoconductor, forming an electrostatic latent image by exposing the photoconductor, attaching toner to the electrostatic latent image on the photoconductor, primarily transferring a toner image on the photoconductor to a transfer belt, secondarily transferring the toner image on the transfer belt to a sheet (for example, printing paper), and fixing the toner image to a sheet by using a fixation apparatus.

The fixation apparatus is constituted of a fixation roller and a pressurization roller. A heater is provided in the fixation roller. The image formation apparatus drives the heater so as to heat the fixation roller and presses the conveyed sheet against the fixation roller with the pressurization roller. The toner image is thus molten and fixed onto the sheet.

In order to prevent wrinkles from being produced in a sheet in the fixation apparatus, tensile force should be applied to the sheet while the sheet is passing between the fixation apparatus and a secondary transfer portion. To that end, the fixation roller is controlled, for example, to be higher in speed of conveyance approximately by 0.2% than the secondary transfer portion. The sheet is thus pulled by the fixation roller and tensile force is applied to the sheet.

When printing is performed while tensile force is applied to the sheet, however, a diameter of the fixation roller increases due to thermal expansion and a speed of conveyance of the fixation roller increases. With increase in speed of conveyance by the fixation roller, a difference in speed of conveyance between the fixation roller and the secondary transfer portion increases and misalignment in transfer in the secondary transfer portion occurs. Misalignment in transfer results in misalignment of colors.

In connection with a technique for solving this problem, Japanese Laid-Open Patent Publication No. 2010-55064 discloses a speed detection-apparatus for "detecting velocity fluctuation of a moving member in a simple manner with high accuracy." The speed detection apparatus obtains an image pattern at a constant time interval during movement of the moving member and calculates a speed of the moving member based on the obtained image pattern. When change in speed is sensed, the speed detection apparatus adjusts a speed of a fixation roller. A difference in speed between the fixation roller and the secondary transfer portion is thus suppressed.

The fixation roller may be eccentric and rotation of the fixation roller may not be stable. When rotation of the fixation roller is not stable, a sheet flutters during conveyance. The speed detection apparatus disclosed in Japanese Laid-Open Patent Publication No. 2010-55064 calculates a speed of a sheet based on a plurality of images obtained by shooting the sheet at a constant interval. When the sheet flutters during conveyance, a size of the sheet in the image fluctuates. Consequently, the speed detection apparatus cannot accurately calculate a speed of the moving member. Therefore, an image formation apparatus which can accurately sense a speed of conveyance of a moving element such as a sheet even when the moving element flutters during conveyance is desired.

SUMMARY OF THE INVENTION

An object in one aspect of the present disclosure is to provide an image formation apparatus which can sense a speed of conveyance of a moving element more accurately than in a conventional example. An object in another aspect is to provide a control program which allows more accurate sensing of a speed of conveyance of a moving element than in the conventional example.

According to one aspect, an image formation apparatus includes a conveyor configured to convey a moving element on which an image is formed, a generator configured to generate a first image and a second image by shooting the conveyed moving element at different timing, a detector configured to sense a first distance between the generator and the moving element at the time of shooting of the first image and sense a second distance between the generator and the moving element at the time of shooting of the second image, and a hardware processor configured to calculate a. speed of conveyance of the moving element based on the first image, the second image, the first distance, and the second distance and output the speed of conveyance.

According to another aspect, a computer-readable recording medium storing a program for controlling an image formation apparatus including a generator is provided. The program causes the image formation apparatus to perform conveying a moving element on which an image is formed, generating at least two images of a first image and a second image by having the generator shoot the conveyed moving element at different timing, sensing a first distance between the generator and the moving element at the time of shooting of the first image and sensing a second distance between the generator and the moving element as the time of shooting of the second image, and calculating a speed of conveyance of the moving element based on the first image, the second image, the first distance, and the second distance and outputting the speed of conveyance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
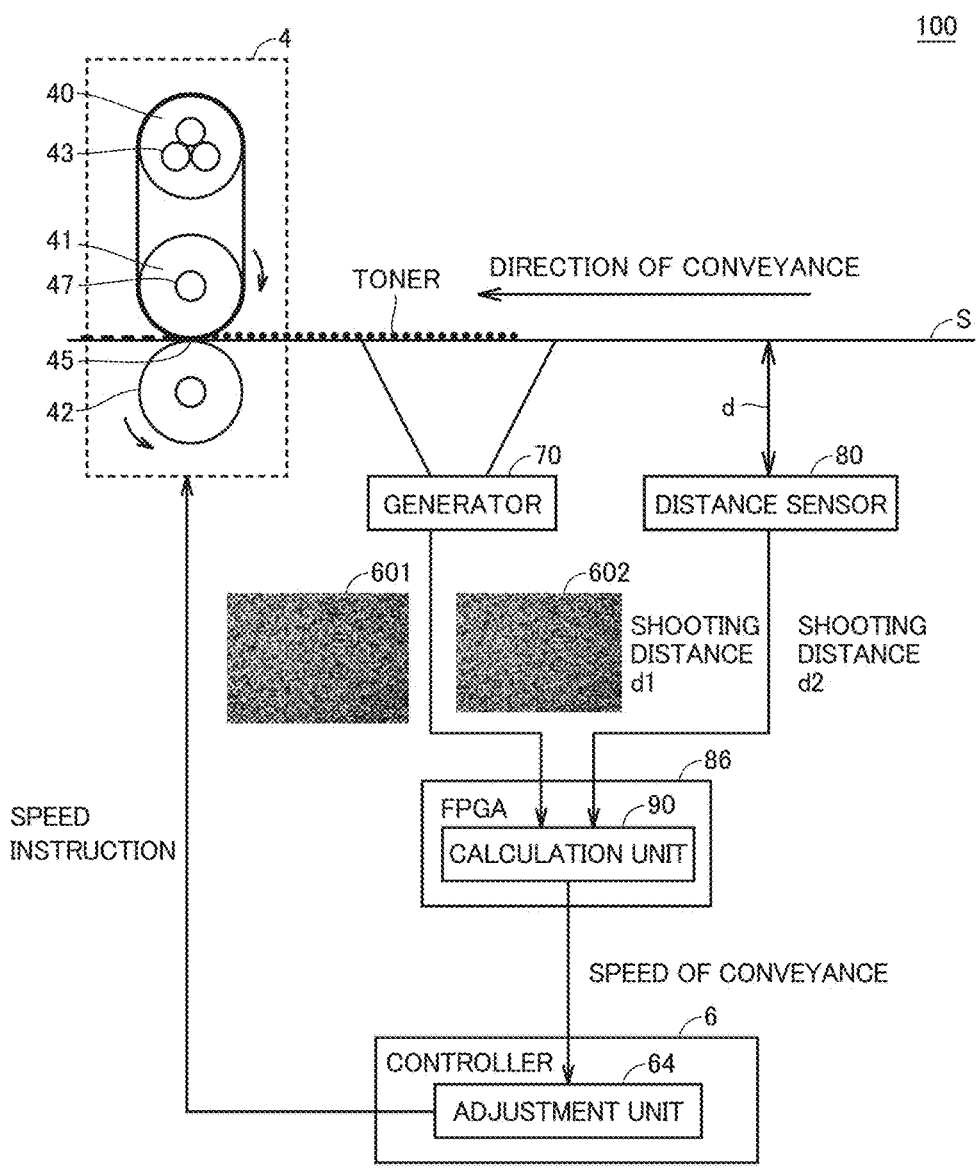
FIG. 1 is a conceptual diagram schematically showing a method of calculating a speed of conveyance of a sheet.

Each embodiment according to the present invention will be described hereinafter with reference to the drawings. In the description below, the same elements and components have the same reference characters allotted. Their label and function are also identical. Therefore, detailed description thereof will not be repeated. Each embodiment and each modification described below may selectively be combined as appropriate.

<First Embodiment>

[Overview]

Overview of an image formation apparatus 100 according to a first embodiment will be described with reference to FIG. 1. FIG. 1 is a conceptual diagram schematically showing a method of calculating a speed of conveyance of a sheet S.

As shown in FIG. 1, image formation apparatus 100 includes a fixation apparatus 4, a controller 6, a generator 70, a distance sensor 80, and a field-programmable gate array (FPGA) 86. Controller 6 is implemented, for example, by a central processing unit (CPU). Controller 6 includes an adjustment unit 64 for adjusting a speed of conveyance of sheet S. FPGA includes a calculation unit 90 for calculating a speed of conveyance of sheet S.

Fixation apparatus 4 includes a cylindrical heating roller 40 in which a heater 43 is located, a fixation roller 41, and a pressurization roller 42. Fixation roller 41 and pressurization roller 42 are in contact with each other at a nip portion 45. Fixation apparatus 4 heats heating roller 40 by increasing a temperature of heater 43 to a prescribed temperature. As heating roller 40 rotates, heat conducts to nip portion 45. Toner is thus molten and fixed onto sheet S.

Generator 70 generates at least two images 601 and 602 by shooting conveyed sheet S at different timing. Generated images 601 and 602 are output to calculation unit 90 of FPGA 86.

A rotation shaft 47 of fixation roller 41 may be displaced from the center of fixation roller 41. When fixation roller 41 is eccentric, a position of nip portion 45 periodically changes. Consequently, a shooting distance d between generator 70 and sheet S periodically changes, which results in unequal magnification of shooting between images 601 and 602 shot at different timing. The magnification of shooting herein refers to a ratio of a size of a subject in an image to a predetermined reference size.

When a speed of conveyance of sheet S is calculated with the use of images 601 and 602 different in magnification of shooting, an error is caused. Therefore, image formation apparatus 100 according to the present embodiment calculates a speed of conveyance in consideration of shooting distance d. Shooting distance d corresponds to a distance between generator 70 and sheet S in a direction of an optical axis of generator 70. In other words, shooting distance d corresponds to a distance between generator 70 and sheet S in a direction perpendicular to a conveyance surface of sheet S.

Distance sensor 80 senses shooting distance d. In the example in FIG. 1, distance sensor 80 senses a shooting distance d1 in synchronization with timing of shooting of image 601. Similarly, distance sensor 80 senses a shooting distance d2 in synchronization with timing of shooting of image 602. Distance sensor 80 outputs shooting distances d1 and d2 to calculation unit 90.

Calculation unit 90 calculates a speed of conveyance of sheet S based on image 601, image 602, shooting distance d1, and shooting distance d2. Image formation apparatus 100 can thus suppress an error in speed of conveyance caused by a difference between shooting distance d1 and shooting distance d2. A method of calculation of a speed of conveyance by calculation unit 90 includes, for example, two methods of a first calculation method and a second calculation method.

In the first calculation method, calculation unit 90 corrects a size of image 601 in accordance with shooting distance d1 and corrects a size of image 602 in accordance with shooting distance d2. More specifically, since a magnification of shooting is lower as the shooting distance is longer, calculation unit 90 enlarges image 601 as shooting distance d1 is longer and enlarges image 602 as shooting distance d2 is longer, with respect to a reference distance set in advance. In other words, since a magnification of shooting is higher as the shooting distance is shorter, calculation unit 90 reduces image 601 as shooting distance d1 is shorter and reduces image 602 as shooting distance d2 is shorter, with respect to a reference distance set in advance. Thus, calculation unit 90 matches the magnification of shooting between image 601 and image 602 and then calculates a speed of conveyance of sheet S based on an amount of change between a pattern of corrected image 601 and a pattern of corrected image 602.

In the second calculation method, calculation unit 90 does not correct a size of images 601 and 602. More specifically, calculation unit 90 calculates a speed of conveyance of sheet S based on an amount of change between an image pattern of image 601 and an image pattern of image 602. Thereafter, calculation unit 90 corrects the calculated speed of conveyance in accordance with a difference between shooting distance d1 and shooting distance d2. More specifically, since an error in speed of conveyance is more likely with a greater difference between shooting distances d1 and d2, calculation unit 90 increases an amount of correction for a speed of conveyance as a difference between shooting distances d1 and d2 is greater. In other words, since an error in speed of conveyance is less likely with a smaller difference between shooting distances d1 and d2, calculation unit 90 decreases an amount of correction for a speed of conveyance as a difference between shooting distances d1 and d2 is smaller. Since an images not enlarged or reduced in the second calculation method, a processing speed is accordingly improved as compared with the first calculation method.

Calculation unit 90 calculates a speed of conveyance of sheet S with any of the first calculation method and the second calculation method in accordance with setting. The setting may arbitrarily be switched by a user of image formation apparatus 100 or may automatically be switched by image formation apparatus 100 depending on a condition.

Since a size of images 601 and 602 is corrected and then a speed of conveyance of sheet S is calculated in the first calculation method, the first calculation method is higher in accuracy in calculation of a speed of conveyance than the second calculation method. Since a speed of conveyance is directly corrected without correcting a size of images 601 and 602 in the second calculation method, the second calculation method is shorter in processing time period than the first calculation method. Therefore, in a situation where accuracy in calculation of a speed of conveyance is required, calculation unit 90 uses the first calculation method, and in a situation where decrease in processing time period is required, it uses the second calculation method. A situation where printing is being performed represents one example of the situation in which accuracy in calculation is required. With higher accuracy in calculation of a speed of conveyance, quality of printing is improved. Therefore, during print processing by image formation apparatus 100, calculation unit 90 switches the setting to the first calculation method, and during processing other than the print processing by image formation apparatus 100, it switches the setting to the second calculation method.

Adjustment unit 64 adjusts a speed of conveyance by fixation apparatus 4 such that the calculated speed of conveyance attains to a predetermined target speed. By way of example, the speed of conveyance is adjusted by controlling a rotation speed of at least one of fixation roller 41 (the first roller) and pressurization roller 42 (the second roller). More specifically, when the calculated speed of conveyance is lower than the target speed, adjustment unit 64 increases a speed of conveyance by fixation apparatus 4. When the calculated speed of conveyance is higher than the target speed, adjustment unit 64 lowers the speed of conveyance by fixation apparatus 4. When the calculated speed of conveyance matches with the target speed, adjustment unit 64 maintains the speed of conveyance by fixation apparatus 4. Adjustment unit 64 can thus allow conveyance of sheet S at an intended speed of conveyance.

Adjustment unit 64 may be provided in FPGA 86 instead of controller 6. Calculation unit 90 maybe provided in controller 6 instead of FPGA 86. Though controller 6 and FPGA 86 are shown as being separate in the example in FIG. 1, controller 6 and FPGA 86 may be configured as an integrated control device.

Though sheet S as continuous form paper is shown in FIG. 1, sheet S may be a conveyed moving element. For example, the moving element includes printing paper of a prescribed size (for example, A3) and a conveyance belt for conveying printing paper.

[Overall Configuration of Image Formation Apparatus 100]

Figure 2:
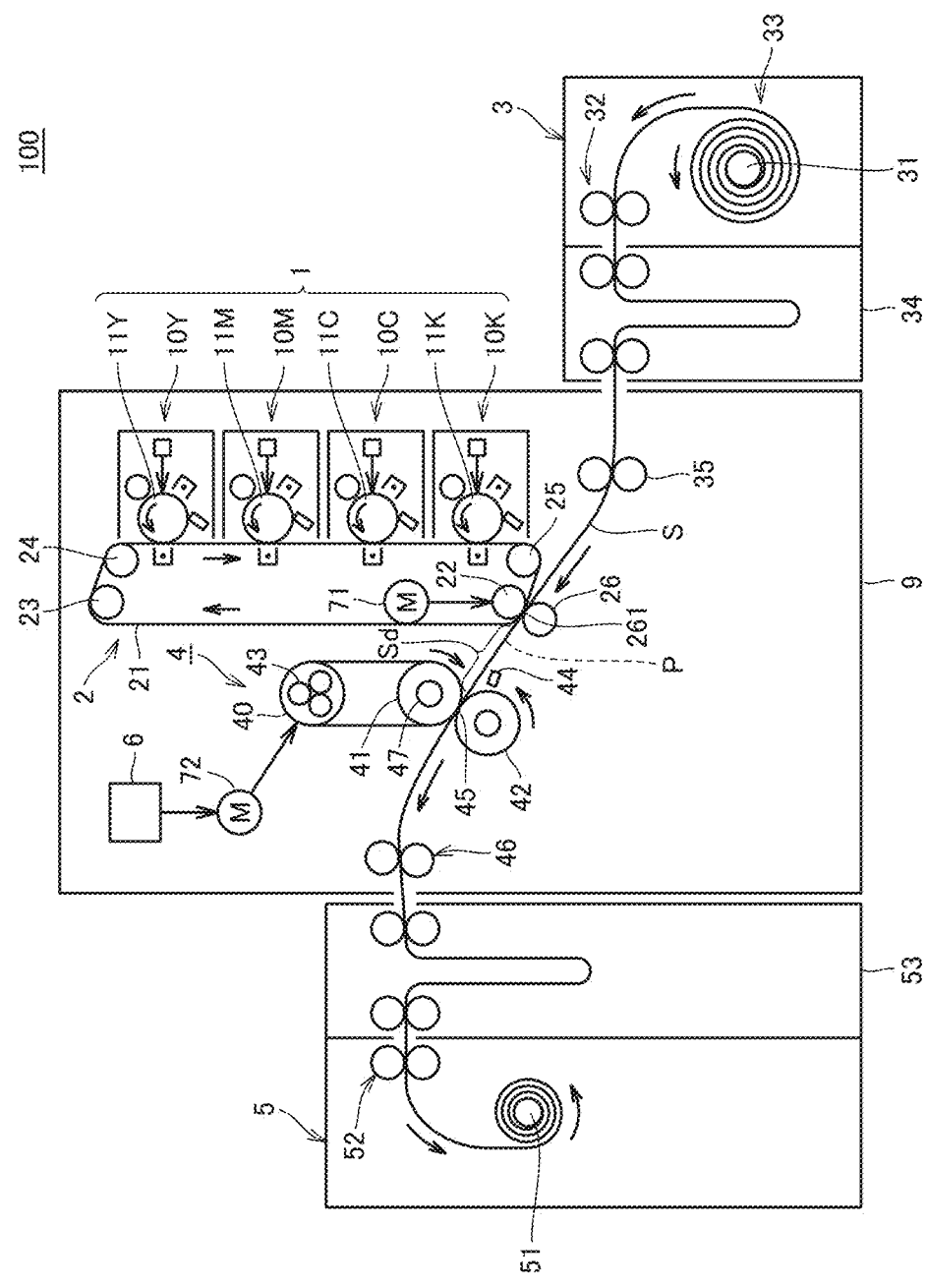
FIG. 2 is a diagram showing one example of an apparatus configuration of an image formation apparatus according to a first embodiment.

An overall configuration of image formation apparatus 100 will be described with reference to FIG. 2. FIG. 2 is a diagram showing one example of an apparatus configuration of image formation apparatus 100.

FIG. 2 shows image formation apparatus 100 as a color printer. Though image formation apparatus 100 as the color printer is described below, image formation apparatus 100 is not limited to the color printer. For example, image formation apparatus 100 may be a monochrome printer or a multi-functional peripheral (MFP) of a monochrome printer, a color printer, and a FAX as being combined.

As shown in FIG. 2, image formation apparatus 100 includes an image formation portion 1, an intermediate transfer portion 2, a sheet supply portion 3, fixation apparatus 4, a sheet winding portion 5, controller 6, and the like. Image formation apparatus 100 is connected to a network (for example, a local area network (LAN)). When the image formation apparatus accepts an instruction to execute a print job from an external terminal device (not shown), it forms a color image of yellow (Y), magenta (M), cyan (C), and black (K) based on the instruction.

Image formation portion 1 includes imaging units 10Y to 10K corresponding to colors of Y to K, respectively. Imaging unit 10Y charges a surface of a photoconductor drum 11Y which rotates at a constant speed. When an electrostatic latent image is formed on charged photoconductor drum 11Y as a result of exposure and scanning by an exposure portion. Imaging unit 11Y develops an electrostatic latent image with toner of the Y color and electrostatically primarily transfers the developed Y-color toner image to an intermediate transfer belt 21.

Other imaging units 10M, 10C, and 10K perform, charging, exposure, development, and primary transfer similarly to imaging unit 10Y, and primarily transfer an M-color toner image on a photoconductor drum 11M, a C-color toner image on a photoconductor drum 11C, and a K-color toner image on a photoconductor drum 11K to intermediate transfer belt 21. In FIG. 2, timing of formation of the Y- to K-color toner images is predetermined such that multiple transfer of the Y to K-color toner images representing an image of a document of 1 page on intermediate transfer belt 21 is achieved. When there are documents of a plurality of pages, a toner image corresponding to an image of a 1-page document is successively formed on intermediate transfer belt 21 for each page of the document at a constant interval in a direction of circulation of the belt.

Intermediate transfer portion 2 includes intermediate transfer belt 21, a drive roller 22 and driven rollers 23, 24, and 25 over which intermediate transfer belt 21 is looped, a secondary transfer roller 26, and the like.

Drive roller 22 rotates with rotational drive force of a belt motor 71 to thereby circulate intermediate transfer belt 21 in a direction shown with an arrow in the figure. Belt motor 71 is implemented by a direct-current (DC) brushless motor. Driven rollers 23, 24, and 25 are rotated as being driven with circulation of intermediate transfer belt 21.

While intermediate transfer belt 21 circulates, multiple transfer of the Y- to K-color toner images formed by imaging units 10Y to 10K onto a surface of intermediate transfer belt 21 is achieved.

The Y- to K-color toner images resulting from multiple transfer onto intermediate transfer belt 21 are conveyed toward secondary transfer roller 26 arranged to be opposed to drive roller 22 with intermediate transfer belt 21 being interposed, as a result of circulation of intermediate transfer belt 21.

Secondary transfer roller 26 is in contact with the surface of intermediate transfer belt 21 at a secondary transfer position 261 of intermediate transfer belt 21 and is rotated as being driven by circulation of intermediate transfer belt 21.

Sheet supply portion 3 sends elongated sheet S from a roll of paper 33 wound around a rotation shaft 31 to a paper feed adjustment unit 34 through supply rollers 32. Though paper feed adjustment unit 34 conveys sheet S from supply rollers 32 toward conveyance rollers 35 in a main body 9 of image formation apparatus 100, in order to accommodate a difference between a speed of conveyance of sheet S sent out from roll of paper 33 in sheet supply portion 3 and a speed of conveyance of sheet S in main body 9, the paper feed adjustment unit adjusts feed of sheet S to main body 9 by holding elongated sheet S as being sagged. Not only plain paper but also, for example, stick-on paper may be employed as sheet S.

Sheet S supplied to conveyance roller 35 is wound up by a winding roller 51 via secondary transfer position 261, fixation apparatus 4, ejection rollers 46, a paper ejection adjustment unit 53 of sheet winding portion 5, and conveyance rollers 52. In order to accommodate a difference between a speed of conveyance of sheet S in main body 9 and a speed of conveyance of sheet S by winding roller 51 in sheet winding portion 5, paper ejection adjustment unit 33 adjusts ejection of sheet S from main body 9 by holding elongated sheet S as being sagged.

While sheet S is wound up, the Y- to K-color toner images resulting from multiple transfer on intermediate transfer belt 21 are electrostatically collectively secondarily transferred by secondary transfer roller 26 onto a surface on a front side (that is, a side in contact with intermediate transfer belt 21) of sheet S which passes by secondary transfer position 261. When toner images of a plurality of pages are formed on intermediate transfer belt 21 at a constant interval in the direction of circulation of the belt, the toner image on each page is successively secondarily transferred one by one onto sheet S while elongated sheet S passes by secondary transfer position 261. The toner image on each page secondarily transferred onto sheet S is conveyed to fixation apparatus 4 together with wound-up sheet S.

Fixation apparatus 4 includes cylindrical heating roller 40 in which heater 43 is located, cylindrical fixation roller 41, and pressurization roller 42 pressed against fixation roller 41 at nip portion 45 between fixation roller 41 and pressurization roller 42 at a prescribed pressure. Fixation apparatus 4 heats heating roller 40 by increasing a temperature of heater 43 to a prescribed temperature. As heating roller 40 rotates, heat conducts to nip portion 45 between fixation roller 41 and pressurization roller 42. Fixation apparatus 4 maintains a temperature of nip portion 45 at a temperature necessary for fixation of toner (for example, 150° C.).

Fixation roller 41 is driven in a direction shown with an arrow in FIG. 2 by a fixation motor 72 implemented by a DC brushless motor, and rotates around rotation shaft 47. Instead of fixation roller 41, heating roller 40 may rotationally be driven. Pressurization roller 42 is rotated as following fixation roller 41. While sheet S is conveyed by fixation roller 41 and pressurization roller 42 as being sandwiched therebetween, fixation roller 41 and pressurization roller 42 thermally fix a toner image secondarily transferred to sheet S onto a front side of sheet S through heating and pressurization when the toner image passes through nip portion 45.

Sheet S being wound up is conveyed over fixation roller 41 and secondary transfer roller 26. During conveyance, when a sheet portion Sd of sheet S located between fixation roller 41 and secondary transfer roller 26 is sagged, wrinkles may be produced in sheet S at nip portion 45.

In order to prevent production of wrinkles in sheet S, tensile force to some extent is applied to sheet portion Sd in a direction of conveyance of the sheet. This tensile force is produced, for example, by driving fixation roller 41 such that a rotation speed of fixation roller 41 is higher by a certain value than a rotation speed of secondary transfer roller 26.

A speed of conveyance of sheet S is sensed by a sensor unit 44. Sensor unit 44 is located upstream of nip portion 45 in a direction of conveyance of the sheet and under a conveyance path P of sheet S, and it is arranged at a position in the vicinity of nip portion 45. Sensor unit 44 measures a moving speed of a surface on a rear side (that is, on a side where no toner image is transferred) of sheet S conveyed as being sandwiched between fixation roller 41 and pressurization roller 42. A method of measurement will be described later. Sensor unit 44 measures a moving speed of a surface of the sheet every certain interval (for example, several milliseconds) during conveyance of sheet S and sends a result of measurement to controller 6.

[Method of Controlling Fixation Motor 72]

Figure 3:
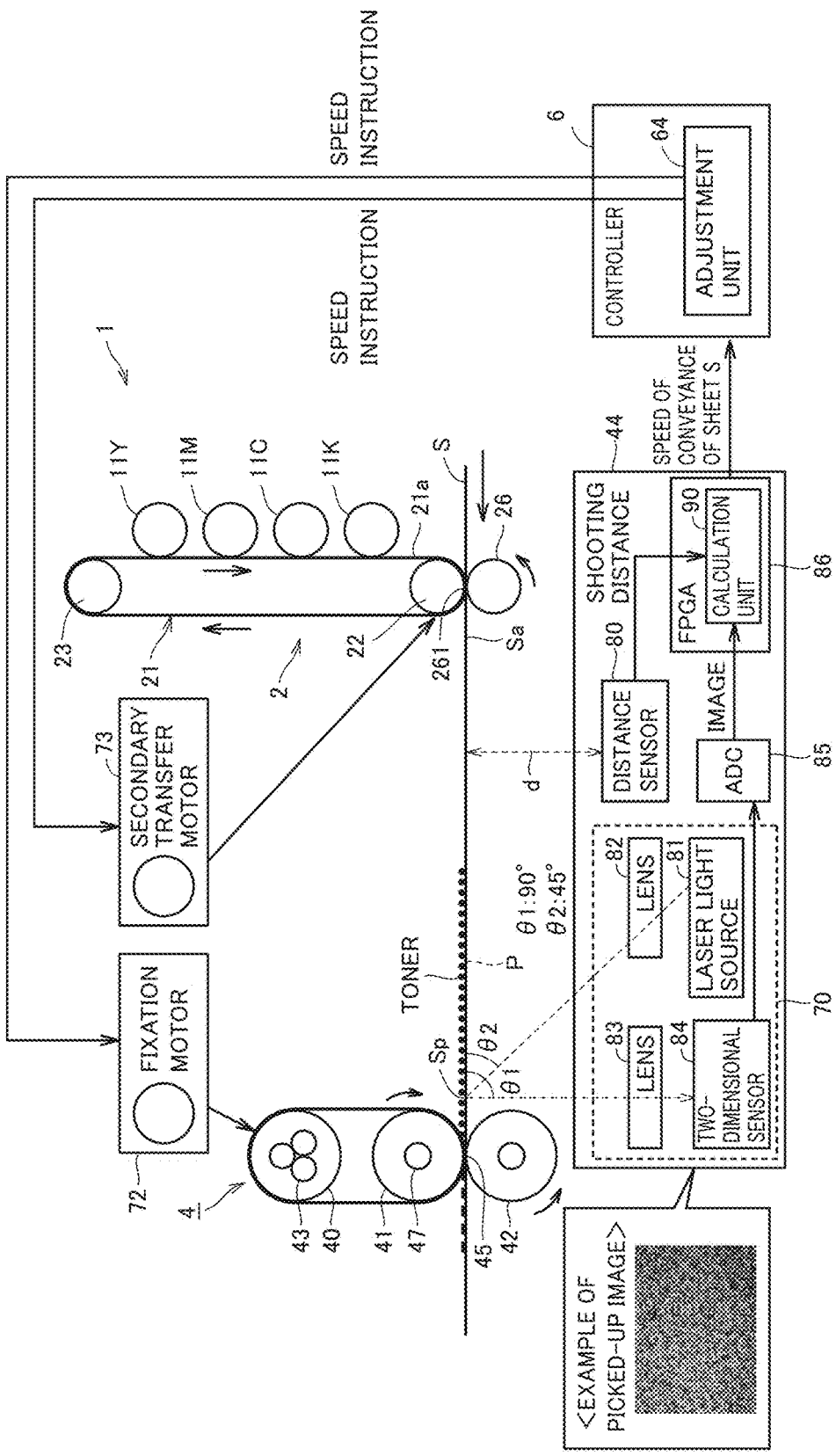
FIG. 3 is a diagram showing conveyance of the sheet to a fixation apparatus.

A method of controlling fixation motor 72 will be described with reference to FIG. 3. FIG. 3 is a diagram showing conveyance of sheet S to fixation apparatus 4.

As shown in FIG. 3, sensor unit 44 includes generator 70, distance sensor 80 (detector), an analog-to-digital converter (ADC) 85, and FPGA 86. Sensor unit 44 is a contactless sensor which measures a moving speed of conveyed sheet S by making use of a speckle pattern.

Distance sensor 86 senses shooting distance d between generator 70 and sheet S. By way of example, distance sensor 80 is an ultrasonic sensor, an infrared sensor, or other sensors which can sense shooting distance d. Distance sensor 80 may sense shooting distance d, for example, with a position sensing device (PSD) scheme or with other schemes.

Generator 70 includes a laser light source 81, lenses 82 and 83 which are collimator lenses, and a two-dimensional sensor 84.

Laser light source 81 emits laser beams to a prescribed irradiation position Sp on conveyance path P. Laser beams emitted from laser light source 81 pass through lens 82 and are emitted onto a surface Sa of conveyed sheet S. The laser beams are emitted to irradiation position Sp upstream of nip portion 45 in the direction of conveyance of the sheet, at a distance of a prescribed distance La from a central position of nip portion 45 in the direction of conveyance of the sheet.

A length of prescribed distance La is a guideline, and irradiation position Sp is desirably set to a position as close as possible to nip portion 45. An angle θ2 formed between laser beams incident on surface Sa of sheet S and surface Sa of sheet S is 45° in FIG. 3. Angle θ2 is not limited to 45°, and any angle within a range, for example, from 20° to 45° may be set.

Surface Sa of sheet S can be a microscopically coarse surface including minor projections and recesses, and when the coarse surface is irradiated with laser beams (coherent beams), a granular pattern called a speckle pattern is produced. The speckle pattern is produced by superimposition of light beams different in phase due to superimposition of scattered light caused by diffusion of laser beams from locations on the coarse surface.

Reflected light resulting from reflection at an angle θ1 (for example, 90°) with respect to surface Sa of sheet S, of laser beams which have produced the speckle pattern is condensed at a sensing surface of two-dimensional sensor 84 serving as a. light reception portion through lens 83 provided directly under irradiation position Sp. An exemplary shot image in FIG. 3 shows an example of an enlarged shot image of a speckle pattern of laser beams condensed at the sensing surface of two-dimensional sensor 84. Thus, the speckle pattern produced at surface Sa of sheet S located directly above the sensing surface of two-dimensional sensor 84 can be sensed at the sensing surface of two-dimensional sensor 84.

Though the speckle pattern does not vary unless sheet S moves, the speckle patters varies with movement of sheet S. With conveyance of sheet S, a portion of protections and recesses in the coarse surface which passes by position Sp of irradiation with laser beams varies at each time point, and a state of superimposition of diffused light of laser also varies at that time point.

A rate of variation in speckle pattern is dependent on a moving speed of sheet S, and an amount of reception of laser beams at the sensing surface of two-dimensional sensor 84 also varies with variation in speckle pattern. Therefore, by sensing variation over time in amount of reception of laser beams at the sensing surface of two-dimensional sensor 84, a moving speed of the surface of sheet S can be measured. In this sense, position Sp in sheet S of irradiation with laser beams can be defined as a position of measurement of a moving speed of the surface of the sheet.

Though FIG. 3 shows a configuration example in which two-dimensional sensor 84 is arranged directly under irradiation position Sp, limitation thereto is not intended. The position should only be a position at which light reflected at an angle of 90° with respect to surface Sa, of laser beams emitted to surface Sa of sheet S can be received. Limitation to light reflected at an angle of 90° with respect to surface Sa is not intended, and a configuration for measuring light reflected at an angle within a range in which a speed of variation in speckle pattern can be sensed can be adopted. An angle defined, for example, under JIS P8148 and Z8722 may be employed as the angle.

Two-dimensional sensor 84 outputs to ADC 85, an analog voltage signal in accordance with an amount of reception of laser beams condensed at the sensing surface every certain period, for example, every several milliseconds.

ADC 85 converts the analog voltage signal from two-dimensional sensor 84 into a digital signal each time it receives the analog voltage signal with a certain period, and outputs the converted digital signal to FPGA 86.

FPGA 86 includes calculation unit 90 for calculating a speed of conveyance of sheet S. A method of calculation of a speed of conveyance of sheer S by calculation unit 90 will be described later. The calculated speed of conveyance is output to adjustment unit 64 of controller 6.

Adjustment unit 64 obtains a current speed of conveyance of sheet S which is conveyed as being sandwiched between fixation roller 41 and pressurization roller 42 from sensor unit 44 during rotational drive of fixation roller 41. Adjustment unit 64 controls a rotation speed of fixation motor 72 which drives fixation roller 41 based on a speed of conveyance (an actually measured value) of sheet S and sets the speed of conveyance of sheet S to a predetermined target speed.

More specifically, when the actually measured value does not match with a target value, adjustment unit 64 drives fixation motor 72 such that the actually measured value matches with the target speed. When the actually measured value is smaller than the target value, adjustment unit 64 instructs fixation motor 72 to increase a rotation speed. When the actually measured value is greater than the target value, adjustment unit 64 instructs fixation motor 72 to lower the rotation speed. When the actually measured value matches with the target value, adjustment unit 64 instructs fixation motor 72 to maintain the current rotation speed. An instruction to fixation motor 72 is repeated every certain period (for example, several milliseconds). Fixation motor 72 increases or decreases the number of rotations or maintains the number of rotations constant, based on an instruction from adjustment unit 64. The speed of conveyance of sheet S conveyed as being sandwiched between fixation roller 41 and pressurization roller 42 is thus stabilized at the target speed.

Since a moving speed of sheet S is thus directly measured by sensor unit 44, a rotation speed of fixation motor 72 is lowered even though a peripheral speed of fixation roller 41 increases with time due to thermal expansion of fixation roller 41. For example, when fixation roller 41 shrinks due to temperature lowering after thermal expansion as well, a rotation speed of fixation motor 72 is increased.

Therefore, even when a peripheral speed of fixation roller 41 increases or decreases due to increase or decrease in roller diameter caused by thermal expansion and shrinkage of fixation roller 41 and pressurization roller 42 during rotational drive of fixation roller 41, a speed of conveyance of sheet S convoyed as being sandwiched between fixation roller 41 and pressurization roller 42 can be maintained at a predetermined target speed.

Adjustment unit 64 may farther control a rotation speed of a secondary transfer motor 73 which drives drive roller 22 based on a speed of conveyance (an actually measured value) of sheet S. Adjustment unit 64 controls secondary transfer motor 73 such that fixation motor 72 is higher in rotation speed than secondary transfer motor 73. Sheet S is thus pulled by fixation apparatus 4 and production of wrinkles in sheet S at nip portion 45 can be prevented.

[Method of Calculating Speed of Conveyance of Sheet S]

Figure 4:
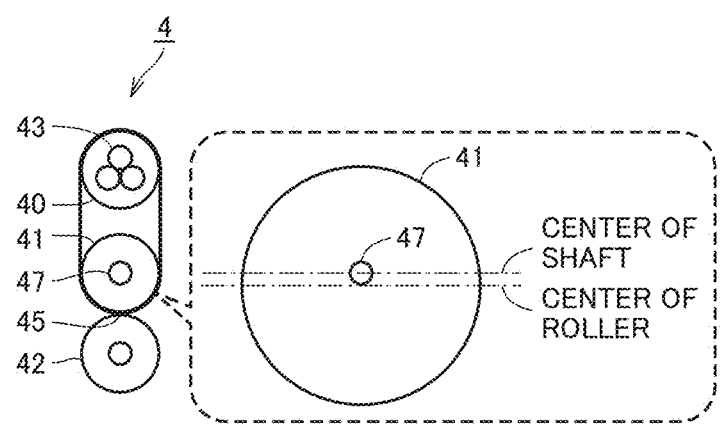
FIG. 4 is a diagram showing the fixation apparatus.
Figure 5:
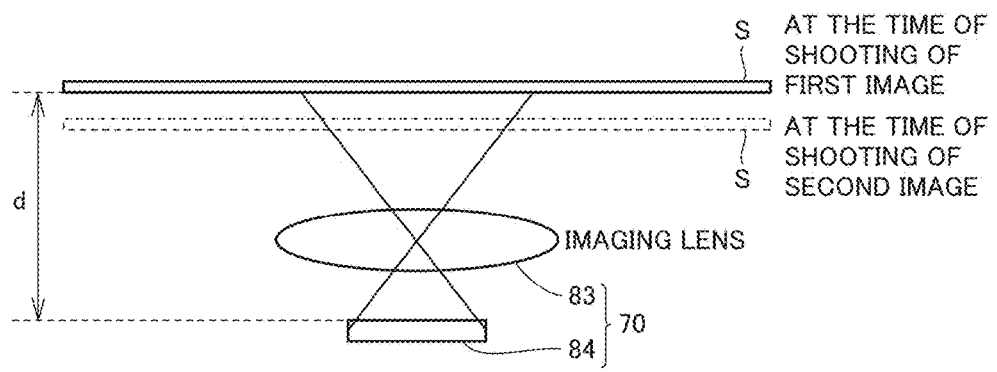
FIG. 5 is a diagram showing fluctuation in shooting distance.
Figure 6:
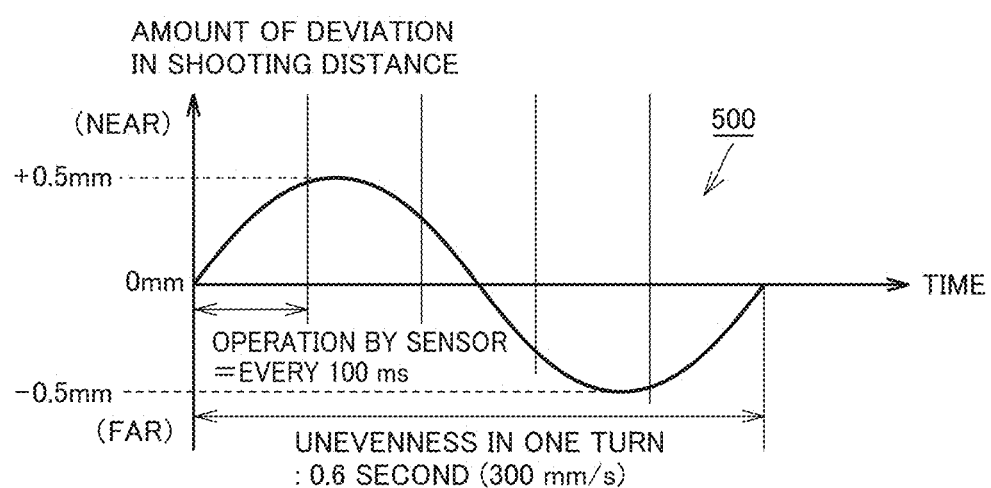
FIG. 6 is a diagram showing change over time in amount of deviation in shooting distance.
Figure 7:
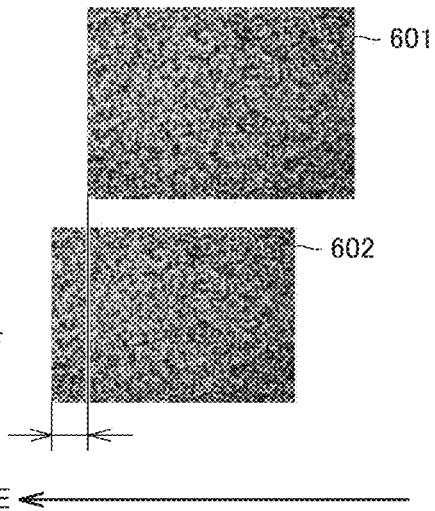
FIG. 7 is a diagram showing two images shot at different shooting distances.
Figure 8:
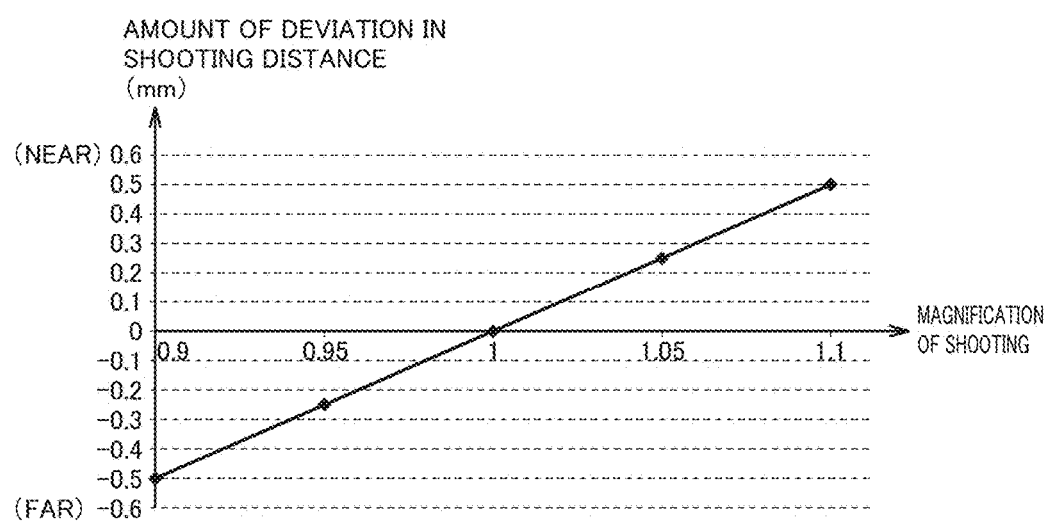
FIG. 8 is a diagram showing relation between an amount of deviation in shooting distance and a magnification of shooting.

A method of calculation of a speed of conveyance of sheet S by calculation unit 90 will be described with reference to FIGS. 4 to 8. FIG. 4 is a diagram showing fixation apparatus 4. FIG. 5 is a diagram showing fluctuation in shooting distance. FIG. 6 is a diagram showing change over time in amount of deviation in shooting distance. FIG. 7 is a diagram showing two images shot at different shooting distances. FIG. 8 is a diagram showing relation between an amount of deviation in shooting distance and a magnification of shooting.

As shown in FIG. 4, rotation shaft 47 of fixation roller 41 may be displaced from the center of fixation roller 41. When fixation roller 41 is eccentric, a position of nip portion 45 which is a portion of contact between fixation roller 41 and pressurization roller 42 periodically changes. Consequently, as shown in FIG. 5, shooting distance d between generator 70 and sheet S varies.

FIG. 6 shows a graph 500 showing periodic fluctuation in shooting distance d. The abscissa in graph 500 represents time. The ordinate in graph 500 represents an amount of deviation in shooting distance d from a predetermined reference position. As shown in graph 500, shooting distance d periodically changes. In the example in graph 500, a period of shooting distance d is 0.6 second and magnitude of deviation is ±0.5 mm. In the following, an amount of deviation in shooting distance in a direction away from generator 70 is expressed with a positive value and an amount of deviation in shooting distance in a direction toward generator 70 is expressed with a negative value.

As shown in FIG. 7, with change in shooting distance d, a magnification of shooting by generator 70 changes. FIG. 7 shows image 601 shot when an amount of deviation in shooting distance is 0 mm and image 602 shot when an amount of deviation in shooting distance is −0.5 mm. A magnification of shooting when a shooting distance is at a reference distance (that is, an amount of deviation=0 mm) is defined as 1.0 time. In the example in FIG. 7, a magnification of image 601 is 1.0 time and a magnification of image 602 is 0.9 time.

The magnification of shooting thus changes depending on a shooting distance. FIG. 8 shows relation between an amount of deviation in shooting distance and a magnification of shooting. As shown in FIG. 8, as an amount of deviation in shooting distance d is greater in a positive direction, that is, as shooting distance d increases, a magnification of shooting is lower. In contrast, as an amount of deviation in shooting distance d is smaller in a negative direction, that is, as shooting distance d decreases, a magnification of shooting is higher.

When a speed of conveyance of sheet S is calculated by using images different in magnification of shooting, an error is produced in speed of conveyance. Then, calculation unit 90 calculates a speed of conveyance such that an error will not be caused by fluctuation in shooting distance d. Two methods of the first calculation method and the second calculation method described above are available as examples of the calculation method. The first calculation method and the second calculation method will be described below in further detail with reference to FIGS. 9 and 10.

(Details of First Calculation Method)

Figure 9:
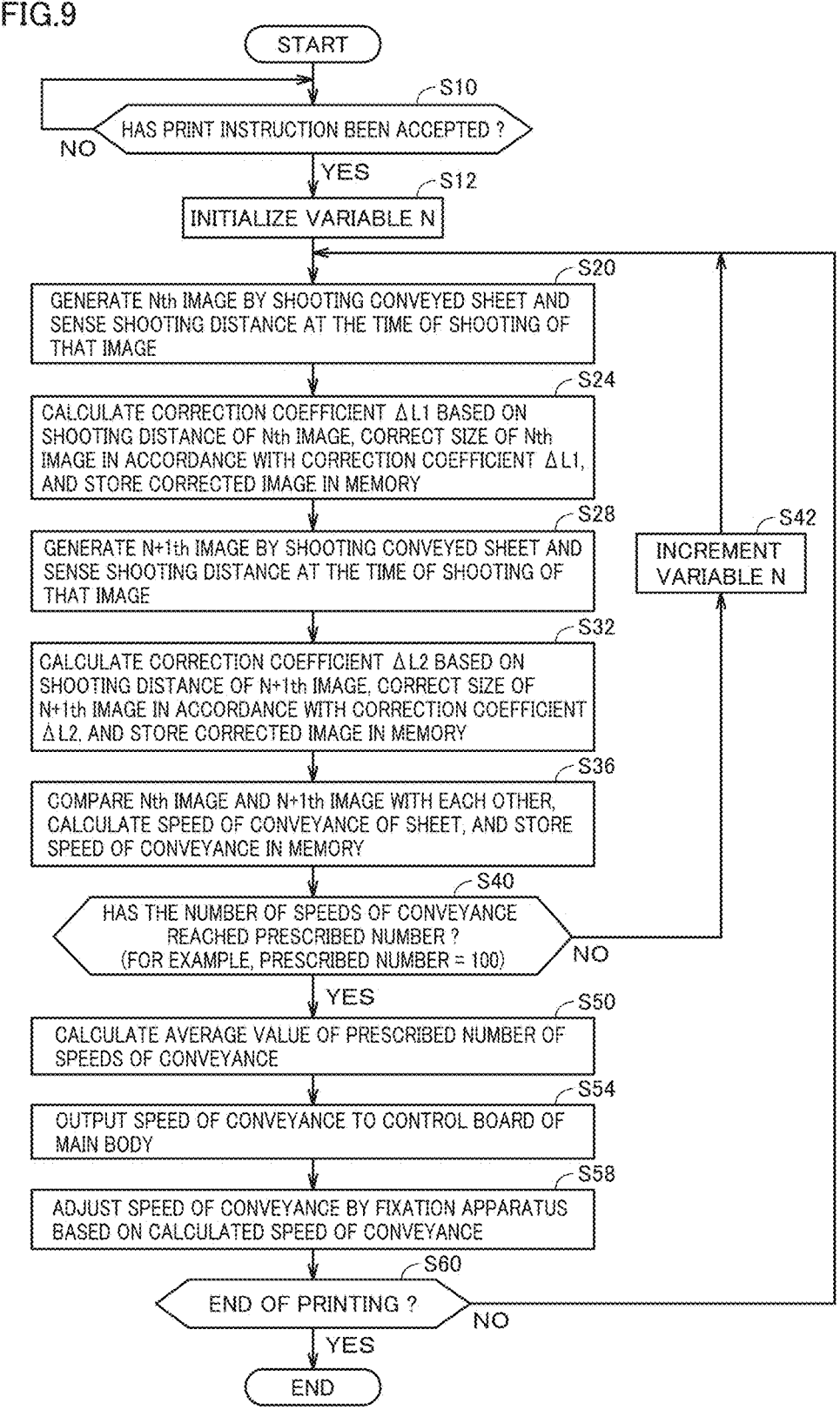
FIG. 9 is a flowchart showing a first method of calculating a speed of conveyance in the first embodiment.

FIG. 9 is a flowchart showing the first method of calculating a speed of conveyance. In the first calculation method, a speed of conveyance of a sheet is calculated after an image size is corrected in accordance with a shooting distance.

A process in FIG. 9 is implemented by execution of a program by controller 6 (see FIG. 1) and FPGA 86 (see FIG. 1). In another aspect, a part or the entirety of the process may be performed by a circuit element or other hardware.

In step S10, FPGA 86 determines whether or not a print instruction has been accepted. When FPGA 86 determines that the print instruction has been accepted (YES in step S10), control is switched to step S12. Otherwise (NO in step S10), FPGA 86 performs the processing in step S10 again.

In step S12, FPGA 86 initializes a variable N representing a number of a shot image. By way of example, variable N is initialized to 1.

In step S20, FPGA 86 sends a shooting instruction to generator 70 (see FIG. 1) during conveyance of a sheet. Upon receiving the shooting instruction, generator 70 shoots a conveyed sheet and generates an Nth image. Simultaneously, FPGA 86 sends a sensing instruction to distance sensor 80. Upon receiving the sensing instruction, distance sensor 80 senses a shooting distance of an Nth image.

In step S24, FPGA 86 as calculation unit 90 (see FIG. 1) calculates a correction coefficient ΔL1 based on the shooting distance of the Nth image. Relation between a shooting distance and correction coefficient ΔL1 is held in advance as a function or a table. The relation is predetermined at the time of design or manufacturing based on positional relation between lenses 82 and 83 (see FIG. 1) and two-dimensional sensor 84 (see FIG. 1). By way of example, correction coefficient ΔL1 represents a magnification ratio or a reduction ratio of an image. Since a magnification of shooting is lower as a shooting distance is longer, correction coefficient ΔL1 is defined to be smaller as the shooting distance is longer. FPGA 86 corrects a size of the Nth image in accordance with correction coefficient ΔL1 and has a memory store the corrected image.

In step S28, FPGA 86 sends a shooting instruction for generating an N+1th image to generator 70 after a prescribed period of time (for example, 1 millisecond) has elapsed since shooting of the Nth image. Upon receiving the shooting instruction, generator 70 shoots a conveyed steel and generates an N+1th image. Simultaneously, FPGA 86 sends a sensing instruction to distance sensor 80. Upon receiving the sensing instruction, distance sensor 80 senses a shooting distance of the N+1th image.

In step S32, FPGA 86 as calculation unit 90 calculates a correction coefficient ΔL2 based on the shooting distance of the N+1th image. Since a method of calculating correction coefficient ΔL2 is the same as the method of calculating correction coefficient ΔL1 shown in step S24, description thereof will not be repeated. FPGA 86 corrects a size of the N+1th image in accordance with correction coefficient ΔL2 and has the memory store the corrected image.

In step S36, FPGA 86 as calculation unit 90 calculates a speed of conveyance of a sheet by comparing the Nth image and the N+1th image with each other. These images are speckle pattern images, for example, generated by the projections and recesses in the moving element. As described above, a rate of change in speckle pattern is dependent on a moving speed of the sheet. With attention being paid to this point, FPGA 86 calculates a speed of conveyance of the sheet in accordance with a rate of change in speckle pattern. FPGA 86 has the memory store the calculated speed of conveyance.

In step S40, FPGA 86 determines whether or not the number of speeds of conveyance stored in the memory has reached a prescribed number (for example, 100). In other words, FPGA determines whether or not variable N has reached 100. When FPGA 86 determines that the number of speeds of conveyance stored in the memory has reached the prescribed number (YES in step S40), it switches control to step S50. Otherwise (NO in step S40), FPGA 86 switches control to step S42.

In step S42, FPGA 86 as calculation unit 90 increments variable N. FPGA 86 increases variable N by 1.

In step S50, FPGA 86 as calculation unit 90 calculates an average of the prescribed number of speeds of conveyance stored in the memory.

In step S54, FPGA 86 outputs the calculated speed of conveyance to a control board of a main body (that is, controller 6).

In step S58, controller 6 as adjustment unit 64 (see FIG. 1) adjusts a speed of conveyance by fixation apparatus 4 (see FIG. 1) in accordance with the calculated speed of conveyance. More specifically when the calculated speed of conveyance is lower than a target speed, controller 6 increases a speed of conveyance by fixation apparatus 4. When the calculated speed of conveyance is higher than the target speed, controller 6 lowers the speed of conveyance by fixation apparatus 4. When the calculated speed of conveyance is equal to the target speed, controller 6 maintains the speed of conveyance by fixation apparatus 4.

In step S60, controller 6 determines whether or not print processing has ended. When controller 6 determines that the print processing has ended (YES in step S60), control returns to step S20. Otherwise (NO in step S60), controller 6 quits the control process according to the present embodiment.

(Details of Second Calculation Method)

Figure 10:
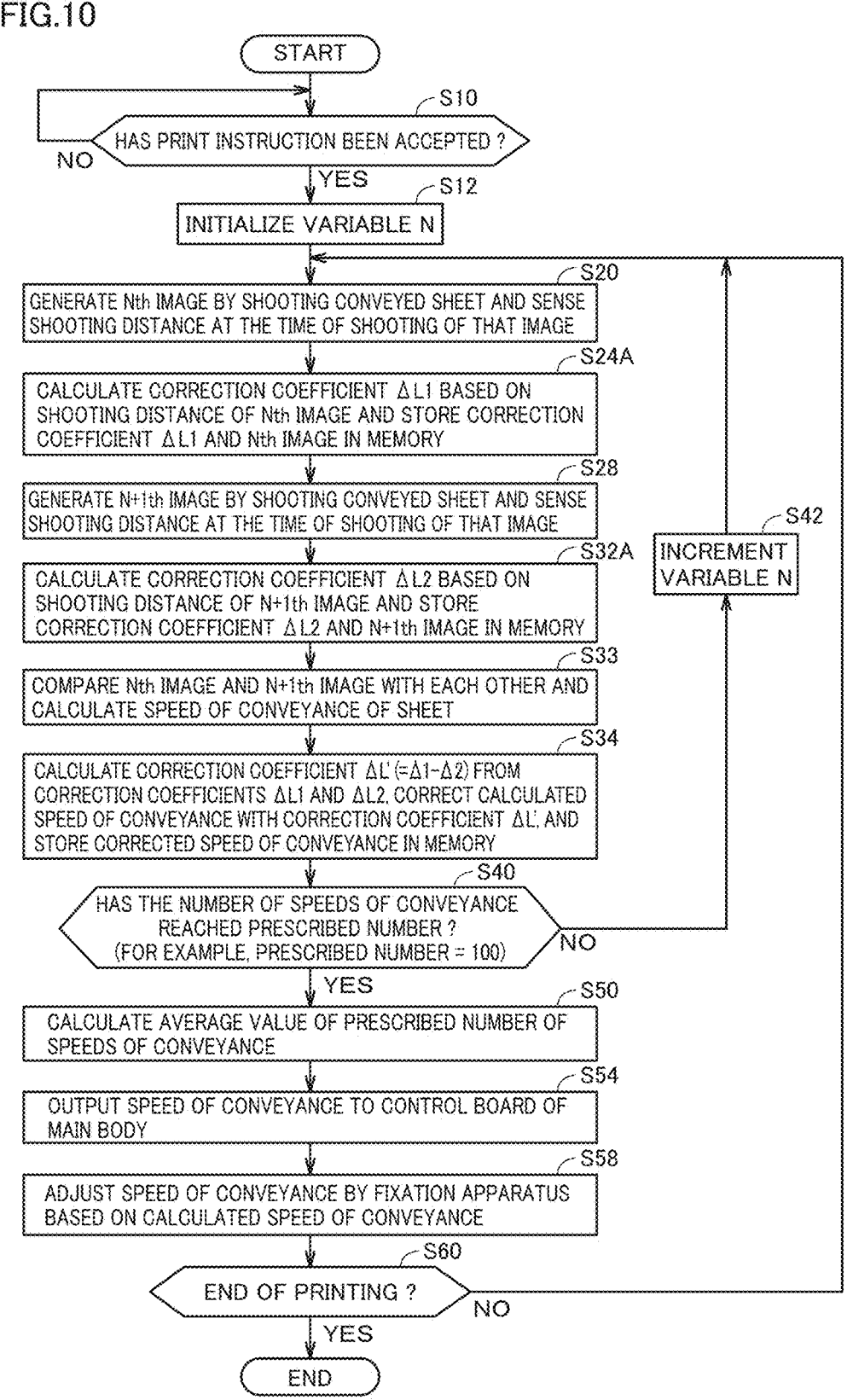
FIG. 10 is a flowchart showing a second method of calculating a speed of conveyance in the first embodiment.

FIG. 10 is a flowchart showing the second method of calculating a speed of conveyance. In the second calculation method, an image is not corrected but a calculated speed of conveyance is corrected in accordance with a shooting distance. A process in FIG. 10 is implemented by execution of a program by controller 6 (see FIG. 1) and FPGA 86 (see FIG. 1). In another aspect, a part or the entirety of the process may be performed by a circuit element or other hardware.

Since processing other than that in steps S24A, S32A, S33, and S34 in FIG. 10 is the same as the processing shown in FIG. 9, description thereof will not be repeated.

In step S24A, FPGA 86 as calculation unit 90 (see FIG. 1) calculates correction coefficient ΔL1 based on a shooting distance of the Nth image. Relation between a shooting distance and correction coefficient ΔL1 is held in advance as a function or a table. FPGA 86 has the memory store correction coefficient ΔL1 and the Nth image.

In step S32A, FPGA 86 calculates correction coefficient ΔL2 based on a shooting distance of the N+1th image as in step S24A. FPGA 86 has the memory store correction coefficient ΔL2 and the N+1th image.

In step S33, FPGA 86 as calculation unit 90 calculates a speed of conveyance of the sheet by comparing the Nth Image and the N+1th image with each other. These images are speckle pattern images, for example, generated by the projections and recesses in the moving element. As described above, a rate of change in speckle pattern is dependent on a moving speed of the sheet. With attention being paid to this point, FPGA 86 calculates a speed of conveyance of the sheet in accordance with a rate of change in speckle pattern. FPGA 86 has the memory store the calculated speed of conveyance.

In step S34, FPGA 86 as calculation unit 90 calculates a correction coefficient ΔL' from correction coefficients ΔL1 and ΔL2. Correction coefficient ΔL' corresponds to a result of subtraction of correction coefficient ΔL2 from correction coefficient ΔL1. FPGA 86 corrects the speed of conveyance calculated in step S33 by using correction coefficient ΔL'. For example, when correction coefficient ΔL1 represents a magnification of shooting of 1.0 time and correction coefficient ΔL2 represents a magnification of shooting of 0.9 time, correction coefficient ΔL' represents a magnification of shooting of 0.1 time (=1.0−0.9). FPGA 86 corrects the speed of conveyance by multiplying the speed of conveyance calculated in step S33 by 1.1 (=0.1+1.0). FPGA 86 has the memory store the corrected speed of conveyance.

[Hardware Configuration of Image Formation Apparatus 100]

Figure 11:
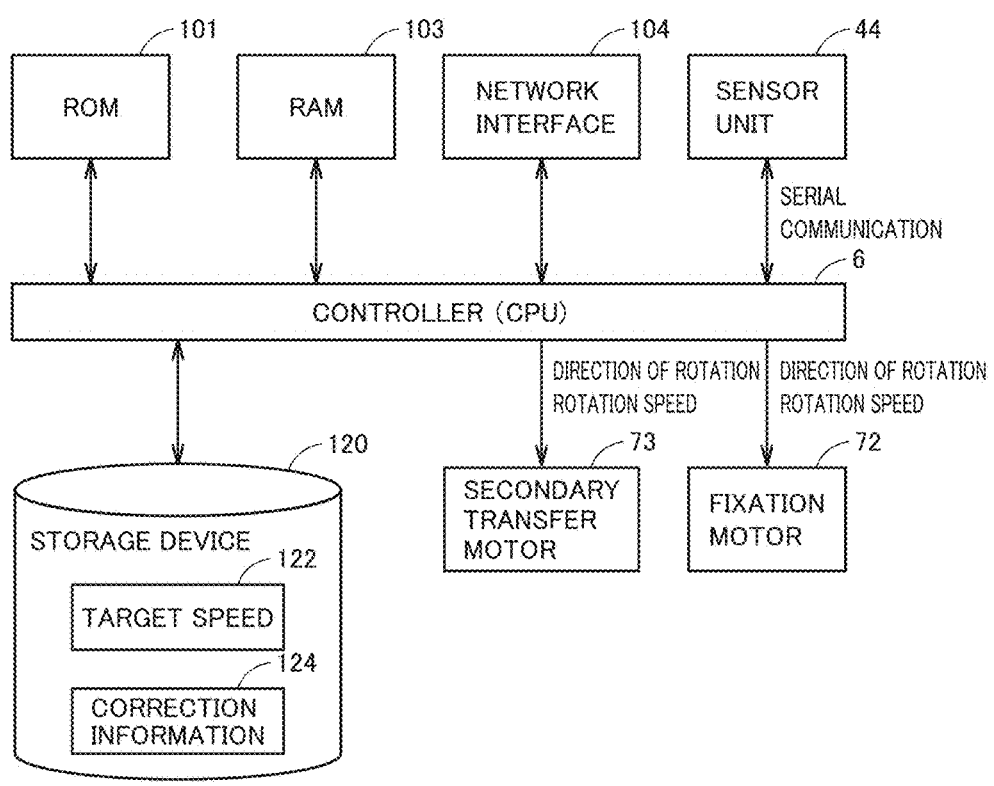
FIG. 11 is a block diagram showing a main hardware configuration of the image formation apparatus according to the first embodiment.

One example of a hardware configuration of image formation apparatus 100 will be described with reference to FIG. 11. FIG. 11 is a block diagram showing a main hardware configuration of image formation apparatus 100. As shown in FIG. 11, image formation apparatus 100 includes controller 6, sensor unit 44, a read only memory (ROM) 101, a random access memory (RAM) 103, a network interface 104, and a storage device 120.

Controller 6 is implemented, for example, by a CPU and controls operations of image formation apparatus 100. By way of example, controller 6 obtains a speed of conveyance of sheet S from sensor unit 44 and controls a rotation speed or a direction of rotation of fixation motor 72 and secondary fixation motor 73 in accordance with the speed of conveyance. Controller 6 communicates with sensor unit 44, for example, through serial communication.

ROM 101 stores a control program executed in image formation apparatus 100. RAM 103 functions as a working memory and temporarily stores various types of data necessary for execution of a control program.

As antenna or the like is connected to network interface 104. Image formation apparatus 100 exchanges data with other communication equipment through the antenna. Other communication equipment includes, for example, a portable communication terminal such as a smartphone and other image formation apparatuses. Image formation apparatus 100 may be configured to be able to download a control program 122 according to the present embodiment from other communication equipment.

Storage device 120 is, for example, a storage medium such as a hard disk or an external storage device. Storage device 120 stores control program 122 for implementing a process according to the present embodiment and correction Information 124 by way of example. Correction information 124 defines relation between a shooting distance of an image and a correction coefficient in accordance with the shooting distance. Correction information 124 may be defined as a table or a function.

Control program 122 according to the present embodiment may be provided not as a program alone but as being incorporated as a part of any program. In this case, the process according to the present embodiment is implemented in cooperation with any program. Even a program not including some modules as such does not depart from the gist of the program according to the present embodiment. Some or all of functions provided by control program 122 according to the present embodiment may be implemented by dedicated hardware. Image formation apparatus 100 may be configured in such a form as what is called a cloud service in which at least one server implements the process according to the present embodiment.

[Summary]

As set forth above, image formation apparatus 100 according to the present embodiment generates at least two images by shooting a conveyed sheet at different timing and simultaneously senses a shooting distance of each image. Image formation apparatus 100 calculates a speed of conveyance of the sheet based on each image and a shooting distance of each image. An error in speed of conveyance caused by the shooting distance can thus be suppressed and the speed of conveyance of the sheet can accurately be sensed.

<Second Embodiment>

[Overview]

Image formation apparatus 100 according to a second embodiment will be described. Image formation apparatus 100 according to the second embodiment generates a distance fluctuation profile by determining periodic fluctuation in shooting distance at the time of start of print processing and estimates a shooting distance based on the distance fluctuation profile. The shooting distance periodically changes. Therefore, if a shooting distance at certain timing can be sensed, a subsequent shooting distance can be estimated from an elapsed time since that timing. Since image formation apparatus 100 thus no longer needs to sense a shooting distance each time an image is obtained, a time period for processing can be shortened.

A first calculation method and a second calculation method to which the process for estimating a shooting distance based on a distance fluctuation profile is applied will be described below.

[First Calculation Method]

Figure 12:
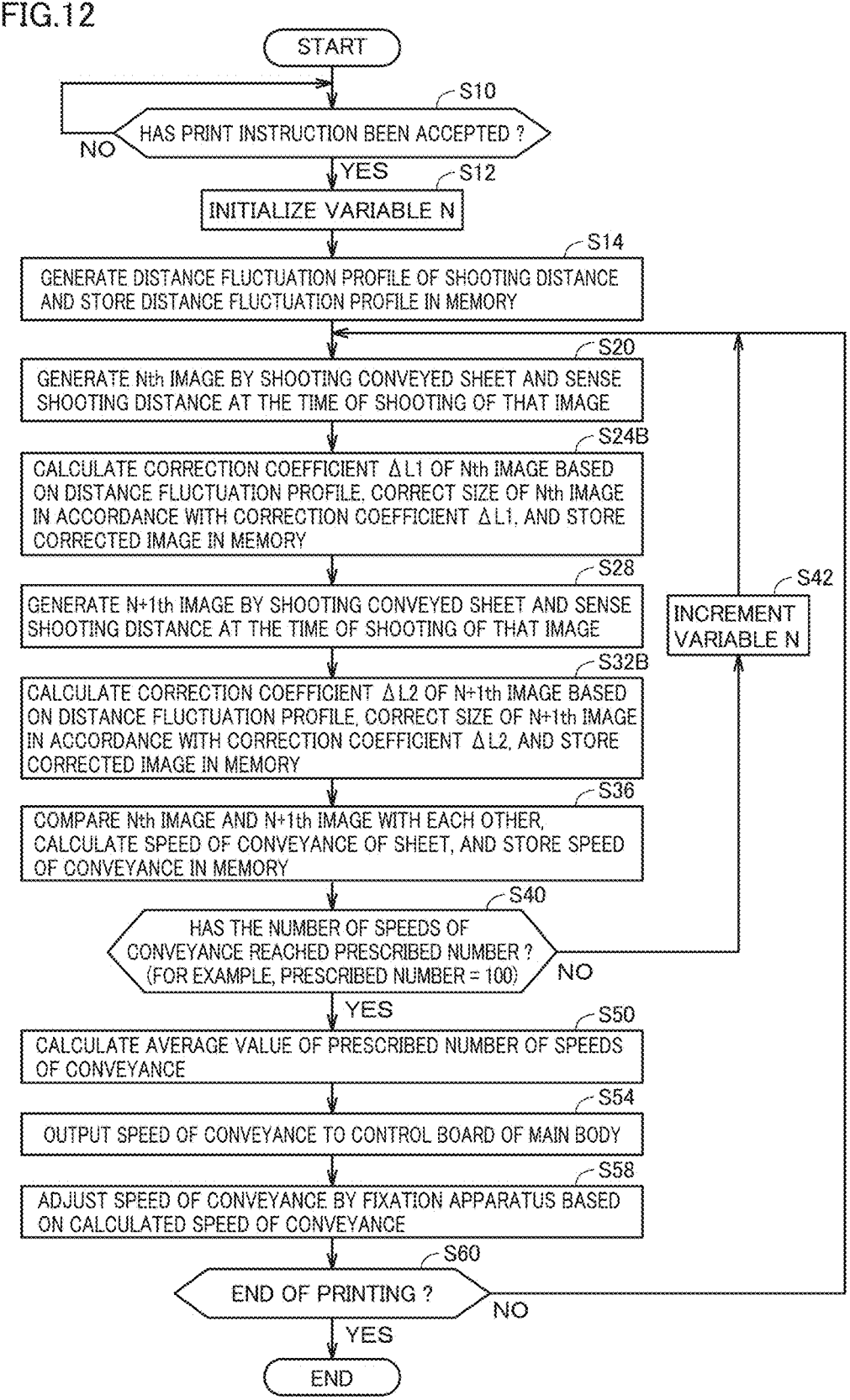
FIG. 12 is a flowchart showing a first method of calculating a speed of conveyance in a second embodiment.
Figure 13:
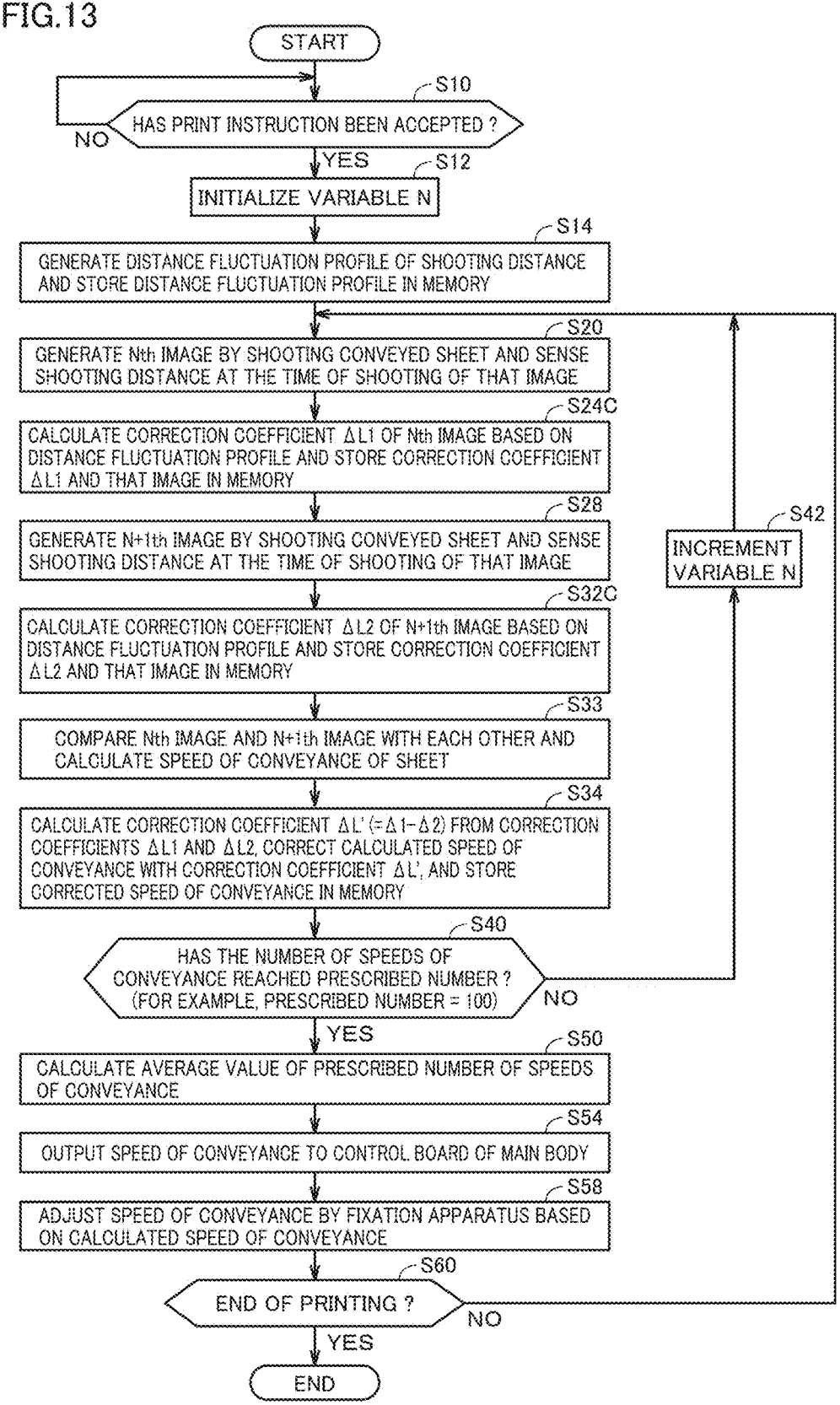
FIG. 13 is a flowchart showing a second method of calculating a speed of conveyance in the second embodiment.

FIG. 13 is a flowchart showing the first calculation method according to the second embodiment. A process in FIG. 12 is implemented by execution of a program by controller 6 (see FIG. 1) and FPGA 86 (see FIG. 1). In another aspect, a past or the entirety of the process may be performed by a circuit element or other hardware.

Since processing other than that in steps S14, S248, and S32B is the same as the processing shown in FIG. 9, description thereof will not be repeated.

In step S14, FPGA 86 drives fixation roller 41 and sends a sensing instruction to distance sensor 80 (see FIG. 1). Distance sensor 80 senses a shooting distance at a certain time interval while fixation roller 41 is driven. FPGA 86 thus obtains fluctuation over time in shooting distance as a distance fluctuation profile. Preferably, FPGA 86 obtains fluctuation in shooting distance during a period in which fixation roller 41 makes at least one rotation (see FIG. 6).

In step S24B, FPGA 86 as calculation unit 90 (see FIG. 1) calculates correction coefficient ΔL1 of the Nth image based on the distance fluctuation profile obtained in step S14. More specifically, with attention being paid to periodic fluctuation in shooting distance, FPGA 86 estimates a shooting distance of the Nth image based on a shooting distance sensed in the past at prescribed timing and an elapsed time since the prescribed timing.

Thereafter, FPGA 86 calculates correction coefficient ΔL1 based on the estimated shooting distance. Relation between a shooting distance and correction coefficient ΔL1 is held in advance as relation or a table. FPGA 86 corrects a size of the Nth image in accordance with correction coefficient ΔL1 and has the memory store the corrected image.

In step S32B, FPGA 86 as calculation unit 90 (see FIG. 1) calculates correction coefficient ΔL2 of the N+1th image based on the distance fluctuation profile obtained in step S14. More specifically, FFGA 86 estimates a shooting distance of the N+1th image based on periodicity in fluctuation in shooting distance and an elapsed time since sensing of the shooting distance of the Nth image. The elapsed time corresponds to a time period from shooting of the Nth image until shooting of the N+1th image.

Thereafter, FPGA 86 calculates correction coefficient ΔL2 based on the estimated shooting distance as in step S24B. FPGA 86 corrects a size of the N+1th image in accordance with correction coefficient ΔL2 and has the memory store the corrected image.

[Second Calculation Method]

FIG. 13 is a flowchart showing the second method of calculating a speed of conveyance in the second embodiment. A process in FIG. 13 is implemented by execution of a program by controller 6 (see FIG. 1) and FPGA 86 (see FIG. 1). In another aspect, a part or the entirety of the process may be performed by a circuit element or other hardware.

Since processing other than that in steps S24C and S32C is the same as the processing shown in FIG. 9, 10, or 12, description thereof will not be repeated.

In step S24C, FPGA 86 as calculation unit 90 (see FIG. 1) calculates correction coefficient ΔL1 of the Nth image based on the distance fluctuation profile obtained in step S14. Since the method of calculating correction coefficient ΔL1 is the same as in step S24B in FIG. 12, description thereof will not be repeated. FPGA 86 has the memory store correction coefficient ΔL1 and the Nth image.

In step S22C, FPGA 86 as calculation unit 90 calculates correction coefficient ΔL2 of the N+1th image based on the distance fluctuation profile obtained in step S14. Since the method of calculating correction coefficient ΔL2 is the same as in step S32B in FIG. 12, description thereof will not be repeated. FPGA 86 has the memory store correction coefficient ΔL2 and the N+1th image.

[Summary]

As set forth above, image formation apparatus 100 according to the second embodiment estimates a shooting distance by making use of periodicity in fluctuation in shooting distance. Since image formation apparatus 100 does not have to sense a shooting distance each time an image is obtained, a processing time period is shortened.

<Third Embodiment>

Figure 14:
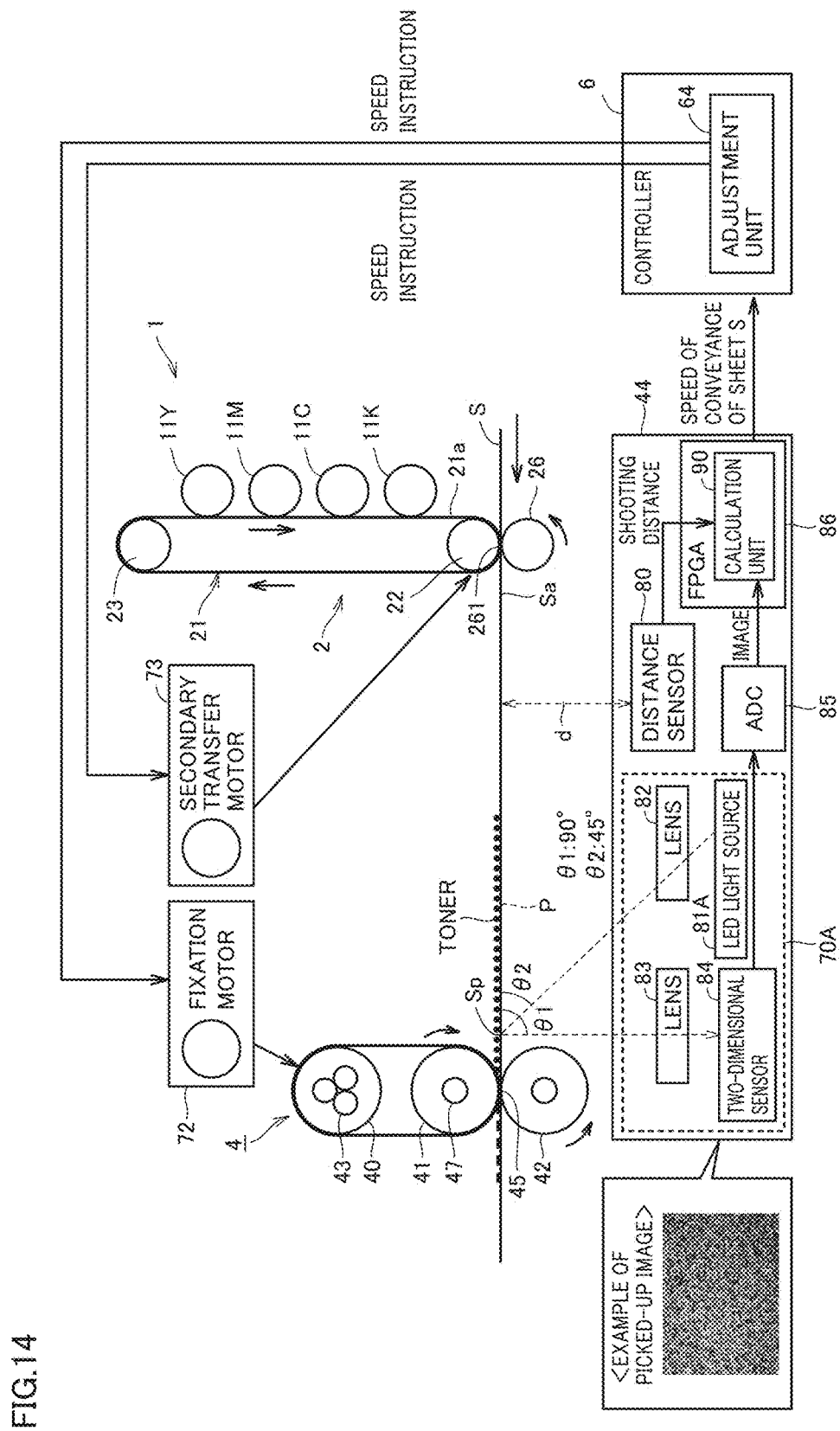
FIG. 14 is a diagram showing an apparatus configuration of the image formation apparatus according to a third embodiment.

Image formation apparatus 100 according to a third embodiment will be described with reference to FIG. 14. FIG. 14 is a diagram showing an apparatus configuration of image formation apparatus 100 according to the third embodiment. Since the configuration other than a generator 70A is as described with reference to FIG. 3, description thereof will not be repeated.

In the first embodiment, generator 70 (see FIG. 3) includes laser light source 81 (see FIG. 3) as a light source. In the third embodiment generator 70A includes an LED light source 81A as a light source. LED light source 81A emits light to conveyed sheet S.

Light emitted from LED light source 81A passes through lens 82 and is reflected by sheet S. The reflected light passes through lens 83 and reaches two-dimensional sensor 84. Two-dimensional sensor 84 picks up an image of the reflected light and generates a shade pattern image produced by the projections and recesses in sheet S. Calculation unit 90 calculates a speed of conveyance of sheet S based on change in amount of received light caused by change in shade pattern.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An image formation apparatus comprising:
   a conveyor configured to convey a moving element on which an image is formed;
   a generator configured to generate a first image and a second image by shooting the conveyed moving element at different timing;
   a detector configured to sense a first distance between the generator and the moving element at time of shooting of the first image and sense a second distance between the generator and the moving element at time of shooting of the second image; and
   a hardware processor configured to:
   correct a size of the first image in accordance with the first distance;
   correct a size of the second image in accordance with the second distance;
   calculate a speed of conveyance of the moving element based on an amount of change between a pattern of the corrected first image and a pattern of the corrected second image; and
   output the speed of conveyance.

2. The image formation apparatus according to claim 1, wherein
   the hardware processor is configured to adjust a speed of conveyance by the conveyor such that the speed of conveyance of the moving element attains to a predetermined target speed based on the output speed of conveyance.

3. The image formation apparatus according to claim 1, wherein
   the hardware processor is configured to enlarge the first image when the first distance is longer than a prescribed reference distance, and enlarge the second image when the second distance is longer than the prescribed reference distance.

4. The image formation apparatus according to claim 1, wherein the hardware processor is configured to enlarge the first image when the first distance is longer than a prescribed reference distance, enlarge the second image when the second distance is longer than the prescribed reference distance, reduce the first image when the first distance is shorter than the prescribed reference distance, and reduce the second image when the second distance is shorter than the prescribed reference distance.

5. The image formation apparatus according to claim 2, wherein the conveyor is a fixation apparatus which fixes a toner image on the moving element onto the moving element,
the fixation apparatus includes a first roller and a second roller which are in contact with each other and conveys the moving element such that the moving element passes between the first roller and the second roller, and
the hardware processor is configured to adjust a rotation speed of at least one of the first roller and the second roller such that a speed of conveyance of the moving element attains to the predetermined target speed.

6. The image formation apparatus according to claim 1, wherein a method of calculation by the hardware processor includes a first calculation method of correcting a size of the first image in accordance with the first distance, correcting a size of the second image in accordance with the second distance, and calculating a speed of conveyance of the moving element based on an amount of change between a pattern of the corrected first image and a pattern of the corrected second image and a second calculation method of calculating a speed of conveyance of the moving element based on an amount of change between a pattern of the first image and a pattern of the second image and correcting the calculated speed of conveyance in accordance with a difference between the first distance and the second distance, and
the hardware processor is configured to calculate a speed of conveyance of the moving element with any of the first calculation method and the second calculation method in accordance with setting.

7. The image formation apparatus according to claim 6, wherein the hardware processor is configured to switch the setting to the first calculation method during print processing by the image formation apparatus and switch the setting to the second calculation method in processing other than the print processing by the image formation apparatus.

8. The image formation apparatus according to claim 1, wherein the detector is configured to sense periodic fluctuation in distance between the generator and the moving element and sense the second distance based on periodicity in fluctuation in distance and an elapsed time since sensing of the first distance.

9. The image formation apparatus according to claim 1, the image formation apparatus further comprising a laser light source which emits laser beams to the conveyed moving element, wherein the generator is configured to generate a speckle pattern image produced by projections and recesses in the moving element by receiving reflected light of the laser beams from the moving element, and each of the first image and the second image is the speckle pattern image.

10. The image formation apparatus according to claim 1, the image formation apparatus further comprising a light emitting diode (LED) light source which emits light to the conveyed moving element, wherein the generator is configured to generate a shade pattern image produced by projections and recesses in the moving element by receiving reflection of the light from the moving element, and
each of the first image and the second image is the shade pattern image.

11. A non-transitory computer-readable recording medium storing a program for controlling an image formation apparatus including a generator, the program causing the image formation apparatus to perform:

conveying a moving element on which an image is formed;
generating at least two images of a first image and a second image by having the generator shoot the conveyed moving element at different timing;
sensing a first distance between the generator and the moving element at time of shooting of the first image and sensing a second distance between the generator and the moving element at time of shooting of the second image;
correcting a size of the first image in accordance with the first distance;
correcting a size of the second image in accordance with the second distance;
calculating a speed of conveyance of the moving element based on an amount of change between a pattern of the corrected first image and a pattern of the corrected second image; and
outputting the speed of conveyance.

12. The non-transitory computer-readable recording medium according to claim 11, wherein the program further causes the image formation apparatus to perform adjusting a speed of conveyance by a conveyor configured to convey the moving element such that the speed of conveyance of the moving element attains to a predetermined target speed based on the output speed of conveyance.

13. The non-transitory computer-readable recording medium according to claim 11, wherein the calculating a speed of conveyance includes enlarging the first image when the first distance is longer than a prescribed reference distance, and enlarging the second image when the second distance is longer than the prescribed reference distance.

14. The non-transitory computer-readable recording medium according to claim 11, wherein the calculating a speed of conveyance includes enlarging the first image when the first distance is longer than a prescribed reference distance, enlarging the second image when the second distance is longer than the prescribed reference distance, reducing the first image when the first distance is shorter than the prescribed reference distance, and reducing the second image when the second distance is shorter than the prescribed reference distance.

15. The non-transitory computer-readable recording medium according to claim 12, wherein the conveyor is a fixation apparatus which fixes a toner image on the moving element onto the moving element,
the fixation apparatus includes a first roller and a second roller which are in contact with each other and conveys the moving element such that the moving element passes between the first roller and the second roller, and the adjusting a speed of conveyance includes adjusting a rotation speed of at least one of the first roller and the second roller such that a speed of conveyance of the moving element attains to the predetermined target speed.

16. The non-transitory computer-readable recording medium according to claim 11, wherein a method of calculation of a speed of conveyance includes a first calculation method of correcting a size of the first image in accordance with the first distance, correcting a size of the second image in accordance with the second distance, and calculating a speed of conveyance of the moving element based on an amount of change between a pattern of the corrected first image and a pattern of the corrected second image and a second calculation method of calculating a speed of conveyance of the moving element based on an amount of change between a pattern of the first image and a pattern of the second image and correcting the calculated speed of conveyance in accordance with a difference between the first distance and the second distance, and the calculating a speed of conveyance includes calculating a speed of conveyance of the moving element with any of the first calculation method and the second calculation method in accordance with setting.

17. An image formation apparatus comprising:

a conveyor configured to convey a moving element on which an image is formed;

a generator configured to generate a first image and a second image by shooting the conveyed moving element at different timing;

a detector configured to sense a first distance between the generator and the moving element at time of shooting of the first image and sense a second distance between the generator and the moving element at time of shooting of the second image; and a hardware processor configured to:

calculate a speed of conveyance of the moving element based on an amount of change between a pattern of the first image and a pattern of the second image;

correct the calculated speed of conveyance in accordance with a difference between the first distance and the second distance; and output the speed of conveyance.

18. A non-transitory computer-readable recording medium storing a program for controlling an image formation apparatus including a generator, the program causing the image formation apparatus to perform:

conveying a moving element on which an image is formed;

generating at least two images of a first image and a second image by having the generator shoot the conveyed moving element at different timing;

sensing a first distance between the generator and the moving element at time of shooting of the first image and sensing a second distance between the generator and the moving element at time of shooting of the second image;

calculating a speed of conveyance of the moving element based on an amount of change between a pattern of the first image and a pattern of the second image;

correcting the calculated speed of conveyance in accordance with a difference between the first distance and the second distance; and outputting the speed of conveyance.

* * * * *